(12) United States Patent
Utley et al.

(10) Patent No.: US 10,090,494 B2
(45) Date of Patent: Oct. 2, 2018

(54) SUPPORT STRUCTURE FOR BATTERY CELLS WITHIN A TRACTION BATTERY ASSEMBLY

(71) Applicant: Ford Global Technologies, LLC, Dearborn, MI (US)

(72) Inventors: Brian Utley, Canton, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 14/230,313

(22) Filed: Mar. 31, 2014

(65) Prior Publication Data

US 2015/0280184 A1 Oct. 1, 2015

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
None
See application file for complete search history.

(56) References Cited

U.S. PATENT DOCUMENTS

| 2003/0059676 | A1* | 3/2003 | Ruiz Rodriguez | H01M 2/0242 429/164 |
| 2012/0091955 | A1 | 4/2012 | Gao | |
| 2012/0141855 | A1* | 6/2012 | Okada | H01M 2/1077 429/99 |
| 2012/0177952 | A1 | 7/2012 | Maguire et al. | |
| 2013/0071703 | A1 | 3/2013 | Traczek et al. | |
| 2013/0202926 | A1* | 8/2013 | Yoon | H01M 2/1022 429/82 |
| 2013/0330587 | A1* | 12/2013 | Takahashi | H01M 2/1077 429/99 |
| 2014/0044995 | A1* | 2/2014 | Moon | H01M 2/1022 429/7 |

FOREIGN PATENT DOCUMENTS

EP 2528134 A1 11/2012

\* cited by examiner

*Primary Examiner* — Sarah A. Slifka
*Assistant Examiner* — Haroon S. Sheikh
(74) *Attorney, Agent, or Firm* — David B. Kelley; Brooks Kushman P.C.

(57) ABSTRACT

A traction battery assembly may include an array of battery cells having opposing end faces, opposing side faces, and a bottom face. The assembly may also include a pair of end plates and a pair of side plates arranged to form a four-sided enclosure around the end and side faces and configured to compress and retain the cells without being mechanically attached thereto or covering the bottom face. The side plates may partially cover an upper portion of the array. The side plates may have a lower horizontal edge, an upper horizontal edge, and at least one diagonal reinforcement rib configured to extend from a location where the vertical edge and lower horizontal edge meet upward to the upper horizontal edge.

13 Claims, 6 Drawing Sheets

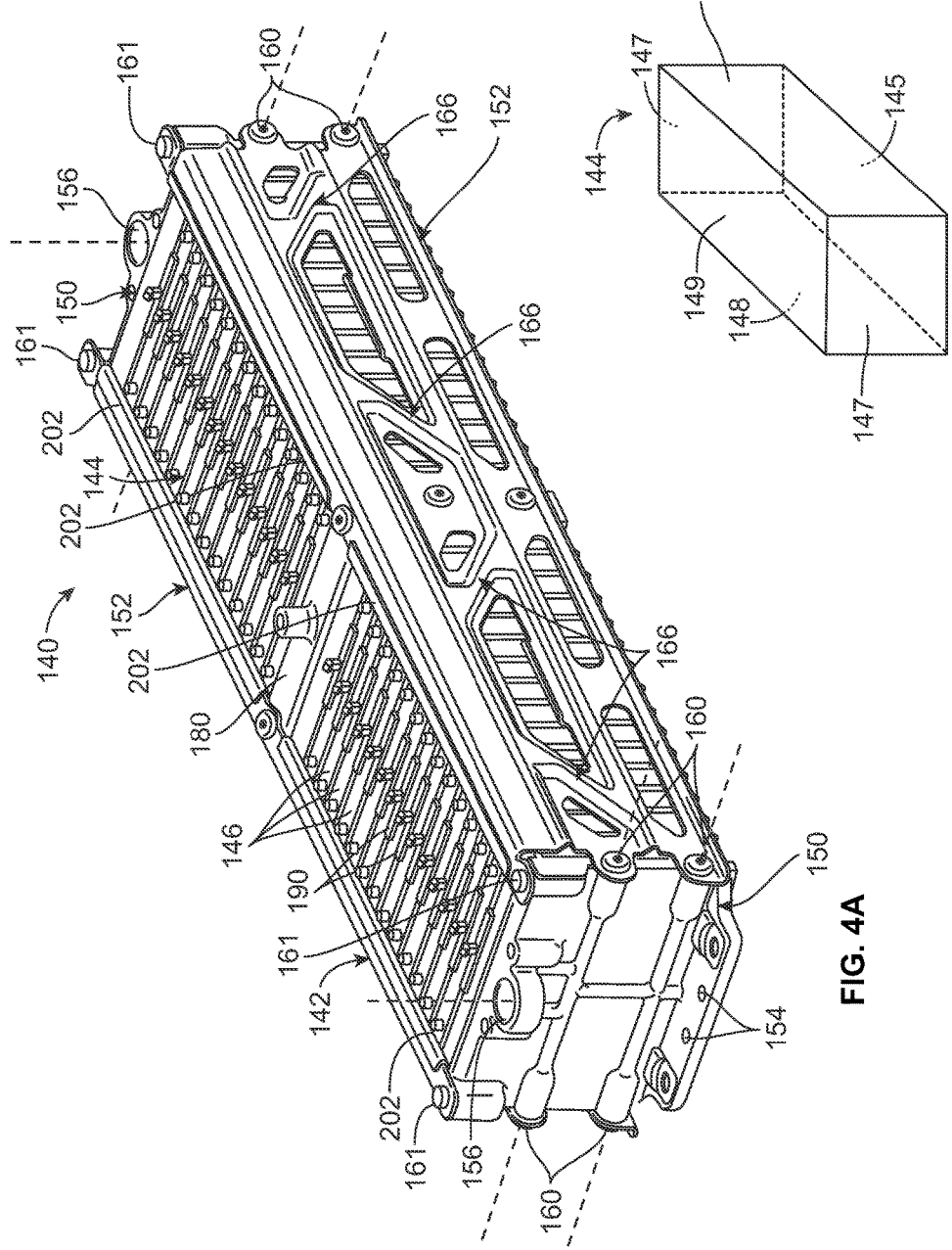

SUPPORT STRUCTURE FOR BATTERY CELLS WITHIN A TRACTION BATTERY ASSEMBLY

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain a traction battery, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A traction battery assembly includes an array of battery cells having opposing end faces, opposing side faces, and a bottom face. The assembly also includes a pair of end plates and a pair of side plates arranged to form a four-sided enclosure around the end and side faces and is configured to compress and retain the cells without being mechanically attached thereto or covering the bottom face. The side plates partially cover an upper portion of the array. The end plates and side plates may each have a pair of vertical edge portions and may be mechanically fastened to one another at the respective edge portions. The side plates may define a plane and at least one of the mechanical fasteners may be oriented substantially perpendicular with the plane. The side plates may have a lower horizontal edge, an upper horizontal edge, and at least one diagonal reinforcement rib configured to extend from a location where the vertical edge and lower horizontal edge meet upward to the upper horizontal edge. A midplate may be centrally located within the array, mechanically fastened to the side plates, and configured to receive a bending moment force generated by the side plates. A plurality of spacers may be located between adjacent battery cells and include a tab extending from an upper portion of the spacer configured to locate and mate with a busbar module extending between the opposing end faces of the array. Each of the end plates may define a vertically oriented lift aperture at an upper portion of the end plates configured to be gripped by an installation tool.

A vehicle includes an array of battery cells having opposing end faces, opposing side faces, a bottom face, and an upper face. The vehicle also includes a pair of end plates corresponding to the end faces and a pair of side plates corresponding to the side faces. The plates are configured to compress and retain the array therebetween without being mechanically fastened to the array. The vehicle also includes a plurality of spacers each located between adjacent battery cells, including a tab extending above the upper face, being configured to locate and mate with a busbar module, and defining a lower ridge portion configured to contact and support the adjacent cells at a portion of the cells above the bottom face. Each of the spacers may further define an upper ridge portion configured to contact the adjacent cells at a portion of the cells below the upper face such that the lower ridge portion and upper ridge portion vertically retain the cells. The side plates may define an upper portion configured to cover a portion of the upper face of the cells and a vertically oriented receiving aperture at either ends of the upper portion configured to receive a mechanical fastener and develop a load between the side plates and the cells generated by the compression thereof. A pair of dielectric rails may be located between the upper portion of the side plates and upper face of the array and may have a thickness such that a force is generated between the bottom face and a surface therebelow. The thickness of the dielectric rails may be greater at a mid-span of the dielectric rails than at opposing ends of the dielectric rails. The surface may be an upper portion of a thermal plate in thermal communication with the array. A midplate may be centrally located within the array, mechanically fastened to the side plates, configured to receive a force generated by a bending moment of the side plates, and define a vertical lift aperture at an upper portion of the midplate configured to be gripped by a tool.

A traction battery assembly includes an array of battery cells having opposing end faces, opposing side faces, an upper face, and a bottom face defining a footprint. The assembly also includes a thermal plate in thermal communication with the cells and configured to direct thermal fluid flow therein. The assembly also includes a four-sided support structure located outside the footprint, including opposing end plates and side plates configured to compress and retain the cells therebetween without being mechanically fastened thereto. The side plates include an upper portion covering and extending along a portion of the upper face such that the upper portion and thermal plate generate vertical forces against the upper face and bottom face, respectively. A plurality of spacers may be located between adjacent cells and define upper and lower ridges configured to contact and retain the cells therebetween without contacting the upper or lower face. The end plates and side plates may define attachment apertures oriented substantially parallel with a length of the cells at the four corners of the structure outside the footprint and configured to receive fasteners to mechanically attach the plates to one another. The end plates and side plates may define attachment apertures oriented substantially parallel with a height of the cells at the four corners of the structure outside the footprint and may be configured to receive fasteners to mechanically attach the plates to one another. The side plates may at least partially contact the respective opposing side faces of the array. A midplate may be centrally located within the array and attached to a substantially central portion of either side plate and configured to deflect compressional forces applied to the array. The side plates may define at least one diagonal reinforcement rib extending from a lower horizontal edge of the side plates to a location on the upper portion of the side plates which is substantially equidistant from the end plate and midplate.

BRIEF DESCRIPTION OF THE DRAWINGS

FIG. 4A is a perspective view of a portion of another traction battery assembly including a battery assembly having an exo-support structure and a battery cell array.

FIG. 4B is a perspective view of a battery cell array from the battery assembly of FIG. 4A.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
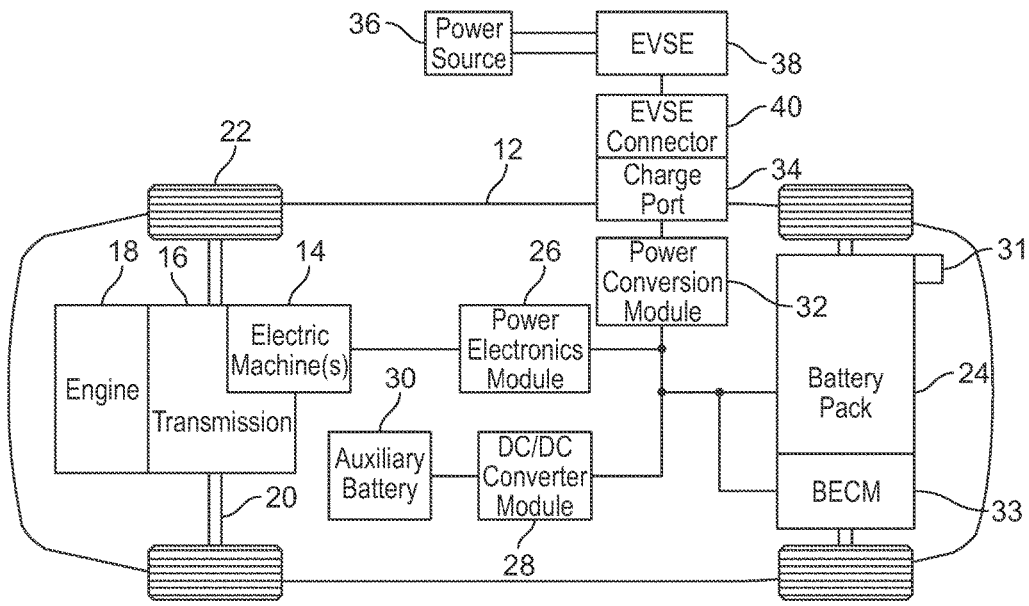
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
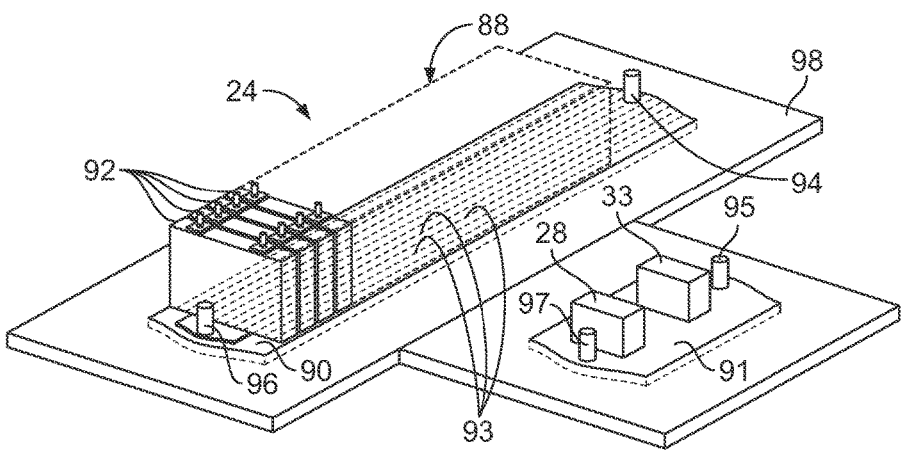
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell array 88 may be positioned at any suitable location in the vehicle 12.

Figure 3:
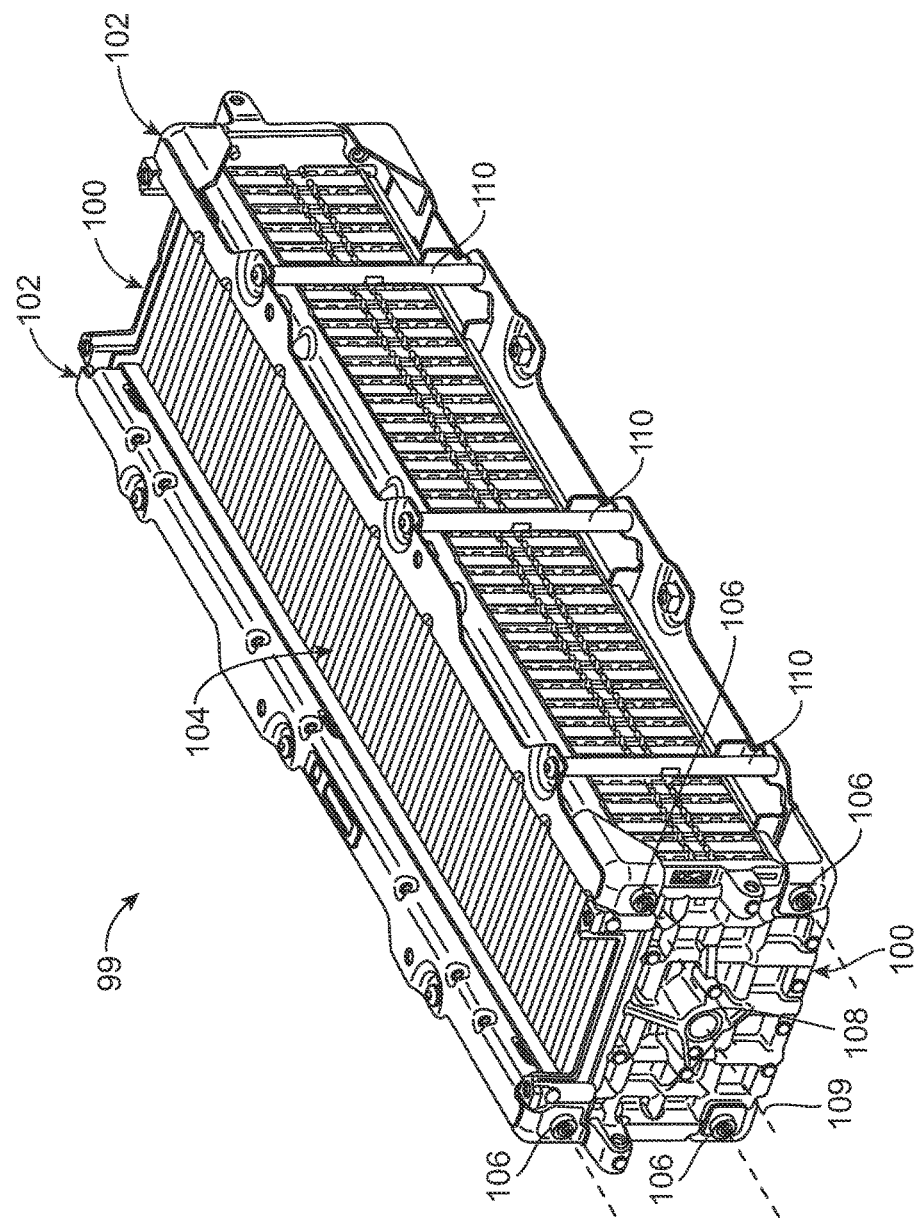
FIG. 3 is a perspective view of a portion of a traction battery assembly.
Figure 6:
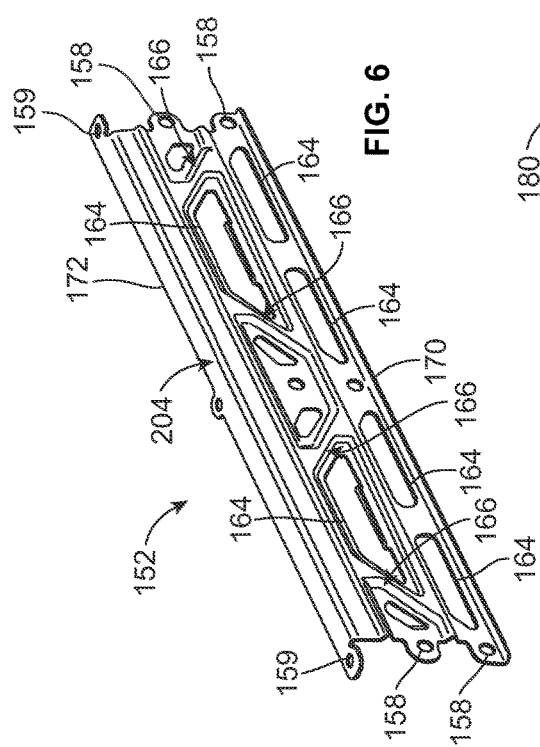
FIG. 6 is a perspective view of a side plate from the battery assembly of FIG. 4A.
Figure 7:
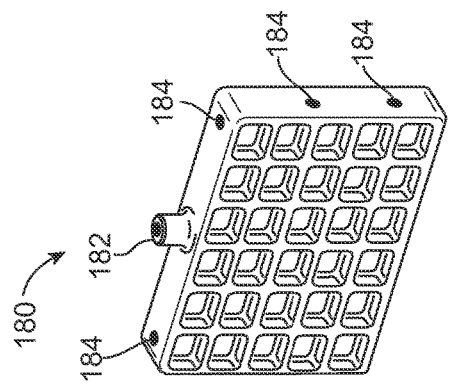
FIG. 7 is a perspective view of a midplate from the battery assembly of FIG. 4A.
Figure 5:
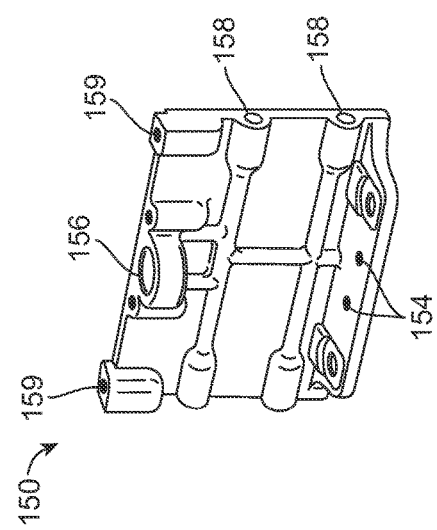
FIG. 5 is a perspective view of an end plate from the battery assembly of FIG. 4A.

FIG. 3 shows an example of a portion of a traction battery including a battery assembly 99 having two lateral end plates 100 and two longitudinal side rail assemblies 102. A battery cell array 104 is located between the lateral end plates 100 and longitudinal side rail assemblies 102. The lateral end plates 100 each include four apertures (not visible in this view) to receive four fasteners (not shown) oriented substantially parallel with a longitudinal axis of the battery cell array 104. The longitudinal side rail assemblies 102 each include four apertures 106 which are in registration with the four apertures of the lateral end plates 100 to receive the four fasteners such that the lateral end plates 100 and longitudinal side rail assemblies 102 may mate. The lateral end plates 100 each include a lift boss 108 which includes an axis 109 substantially parallel with the longitudinal axis of the battery cell array 104. The lift boss 108 provides a location for tooling in an assembly and/or installation setting to grasp the battery assembly. In this example, the location and orientation of the lift boss 108 requires the tooling to grasp in a direction parallel with the axis 109 of the lift bosses 108 and approximately halfway down a height of the battery assembly 99. The longitudinal side rail assemblies 102 each include three columns 110 spaced apart from the battery cell array 104. The side rail assemblies 102 include a lower portion which extends below and contacts the battery cell array 104 and which is configured to assist in supporting the battery cell array 104. This battery assembly 99 is intended for use with an air cooled thermal management system. As such, the space between columns 110 and the battery cell array 104 provides a path for air flow. The structure of the lateral end plates 100 and the side rail assemblies 102 require additional packaging space on the vehicle and additional assembly space due to the tooling approach line which may not be desirable in a thermal management system for a traction battery. Additionally, the side rail assemblies 102 extend below the battery cell array 104 to support and cover a bottom portion of the battery cell array 104, which may not be desirable in a liquid cooled thermal management system since battery cell to thermal plate contact is a factor which assists in providing efficient heat transfer between the two.

FIGS. 4A through 7 show a portion of a traction battery assembly. A battery assembly 140 may include an exo-support structure 142 configured to retain and support a battery cell array 144 including a plurality of battery cells 146 without mechanically fastening thereto. The exo-support structure 142 may form a four-sided enclosure for the battery cell array 144 and may be used for multiple battery cell array 144 embodiments as described further below. The battery cell array 144 may have a bottom face 145, opposing end faces 147, opposing side faces 148, and an upper face 149. The exo-support structure 142 may include end plates 150 and side plates 152 which optionally do not cover or contact the bottom face 145.

The end plates 150 may define one or more locating apertures 154, one or more vertically oriented lift apertures 156, and one or more attachment apertures 158 and 159 to assist in assembling and installing the battery assembly 140. For example, the locating apertures 154 may correspond to respective locating features and/or attachment points on a mounting surface for the battery assembly 140. The lift apertures 156 may be located at an upper portion of the end plates 150 and may be configured to be gripped by a tool during, for example, assembly, installation, and/or shipping. As such, the tool may lower from above the battery assembly 140 and does not need to approach the end plates 150 from the side. This approach path may reduce an amount of assembly and/or installation space required for tooling. Further, package space of the battery assembly 140 may be reduced since the side plates 152 are close to the side faces 148 of the battery cell array 144. An axis of the attachment apertures 158 may be oriented substantially parallel with a length of the battery cells 146 and located at or proximate to the four corners of the exo-support structure 142. These attachment apertures 158 may be configured to receive fasteners 160 to assist in mechanically attaching the end plates 150 and side plates 152 at vertical edges of both. The axis of the attachment apertures 158 may also be substantially perpendicular with a plane defined by the side plates 152. The attachment apertures 158 may also be outside a footprint defined by the battery cell array 144. An axis of the attachment apertures 159 may be oriented substantially parallel with a height of the battery cells 146 and located at or proximate to the four corners of the exo-support structure 142.

The end plates 150 may correspond to the end faces 147 and be configured to receive a clamping compression load directed toward and transferred to the end faces 147 of the battery cell array 144 and other loads. These loads may twist and bend the battery cell array 144 during, for example, installation of the battery assembly 140.

A plurality of spaced apart cutouts 164 may at least be partially defined by diagonal ribs 166 of the side plates 152. The cutouts 164 may have different shapes including the example shown in FIGS. 4 and 6. The side plates 152 may also define a lower horizontal edge 170 and an upper horizontal edge 172. The side plates 152 may partially contact the side faces 148 of the battery cell array 144 or may not directly contact the side faces 148. The diagonal ribs 166 may extend in approximately forty five degree angles from the lower horizontal edge 170 and upper horizontal edge 172 and may provide additional rigidity to the exo-support structure 142. It is contemplated that the diagonal ribs 166 may also extend at angles other than forty five degrees. In one example, one or more of the diagonal ribs 166 may extend from a location in which the vertical edge of the respective end plate 150 is proximate to or meets the lower horizontal edge 170 of the respective side plate 152.

A midplate 180 may be centrally located within the battery cell array 144 and mechanically fastened to the side plates 152. The midplate 180 may provide additional structural rigidity to the exo-support structure 142. For example, it may be desirable to include a midplate 180 when a length of the battery cell array 144 is such that the structural integrity of the battery assembly 140 may be compromised when certain forces are applied. As mentioned above, assembly and/or installation processes may include an application of forces to the battery assembly 140. The midplate 180 may be configured to receive and/or deflect a force generated by a bending load on the side plates 152 and/or the compression forces applied to the battery cell array 144. The midplate 180 may define a vertical lift aperture 182 at an upper portion of the midplate 180 which may be configured to be gripped by a tool. The midplate 180 may also be configured to connect to a support structure above the battery cell array 144, such as a cover for the battery assembly 140. The midplate 180 may also define attachment apertures 184 which may be configured to receive fasteners to assist in mechanically fastening the midplate 180 and side plates 152. To further assist in providing rigidity to the battery assembly 140, the diagonal ribs 166 may extend from the lower horizontal edge 170 of the side plates 152 to a location on the upper horizontal edge 172 of the side plates 152 which is substantially equidistant from the end plates 150 and the midplate 180.

Figure 8:
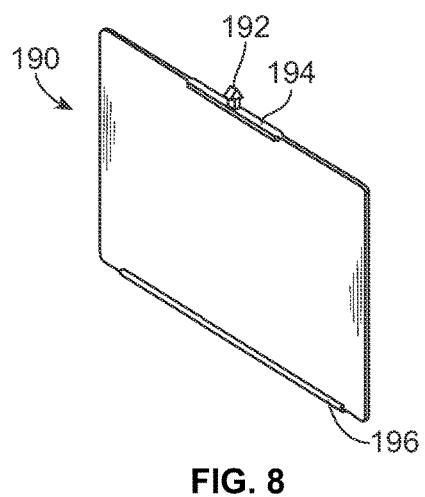
FIG. 8 is a perspective view of a spacer from the battery assembly of FIG. 4A.
Figure 9:
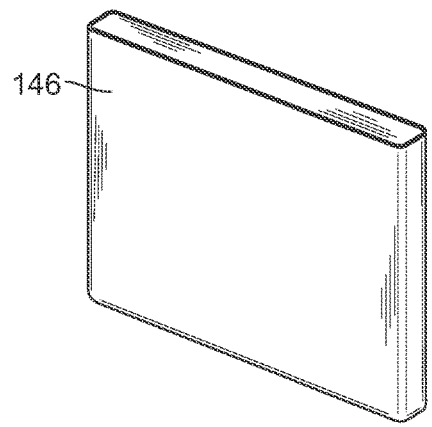
FIG. 9 is a perspective view of a battery cell from the battery assembly of FIG. 4A.
Figure 10:
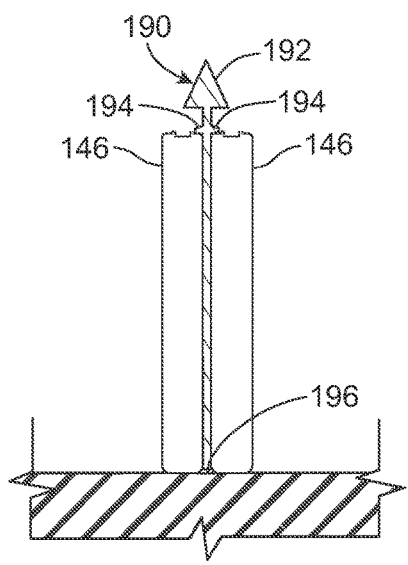
FIG. 10 is a side view of the spacer from FIG. 8 and two battery cells.

Now additionally referring to FIGS. 8 through 10, a plurality of spacers 190 may be located between adjacent battery cells 146. The spacers 190 may be made of a material such as polypropylene and assist in providing electrical creepage and clearance distances between adjacent battery cells 146 and/or between the battery cells 146 and the end plates 150. The spacers 190 may each include a tab 192 extending from an upper portion of the spacers 190. The tabs 192 may be configured to assist in locating components to attach to or mate with the battery assembly 140, such as a busbar module (not shown). The spacers 190 may also define one or more upper ridges 194 and one or more lower ridges 196 which may assist in orienting and retaining the battery cells 146 within the exo-support structure 142. The upper ridges 194 may contact and assist in supporting the battery cells 146 and may be located at an upper edge of the battery cells 146. The lower ridges 196 may contact and assist in supporting the battery cells 146 without interfering with a mating contact between the bottom face 145 defined by the battery cell array 144 or a lower edge of the battery cells 146 and a surface therebelow, such as a thermal plate (not shown).

Figure 11:
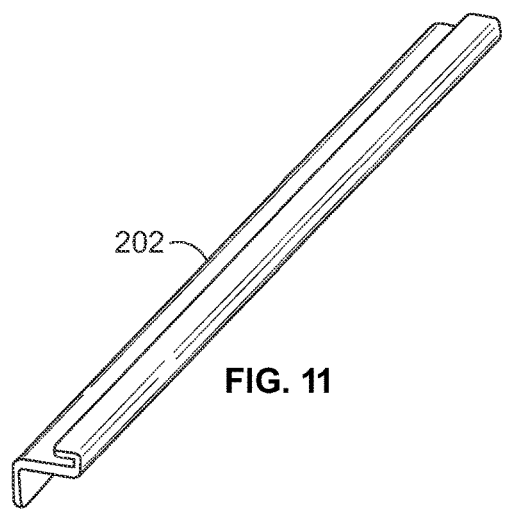
FIG. 11 is a perspective view of a dielectric rail from the battery assembly of FIG. 4A.

FIG. 11 shows an example of a dielectric rail 202. The battery assembly 140 may include one or more dielectric rails 202 located between an upper portion 204 of the side plates 152 and the upper face 149 of the battery cell array 144. The dielectric rails 202 may be composed of a resilient, insulating material such as a rubber, and have a thickness such that a force is generated between the bottom face 145 of the battery cell array 144 and a surface therebelow. One example of the surface is a thermal plate (not shown). The thickness of the dielectric rails 202 may be constant along the length of the dielectric rails 202 which may be in contact with the battery cell array 144. Alternatively, the thickness of the dielectric rails 202 may increase at the mid-span of the dielectric rails 202 such that there is a greater interference contact to the battery cells 146 at the mid-span. Such an increase in thickness at the mid-span of the dielectric rail 202 may be tuned to compensate for a possible max bending deflection that may occur at the mid-span of the dielectric rail 202. Any increase in thickness of the dielectric rails 202 may be gradual or may include discrete steps. The interference thickness may be achieved by a series of down standing bumps or nubs that tend to have a minimum interference contact to the battery cells 146 near the end plates 150, and a maximum interference contact to the battery cells 146 at the mid-span of the dielectric rails 202. The dielectric rails 202 may also assist in electrically isolating the battery cells 146 from the side plates 152. The upper portion 204 of the side plates 152 may cover and extend along a portion of the upper face 149 of the battery cell array 144 such that the upper portion 204 and a surface below the battery cell array 144, such as a thermal plate, may exert vertical forces thereto.

Figure 12:
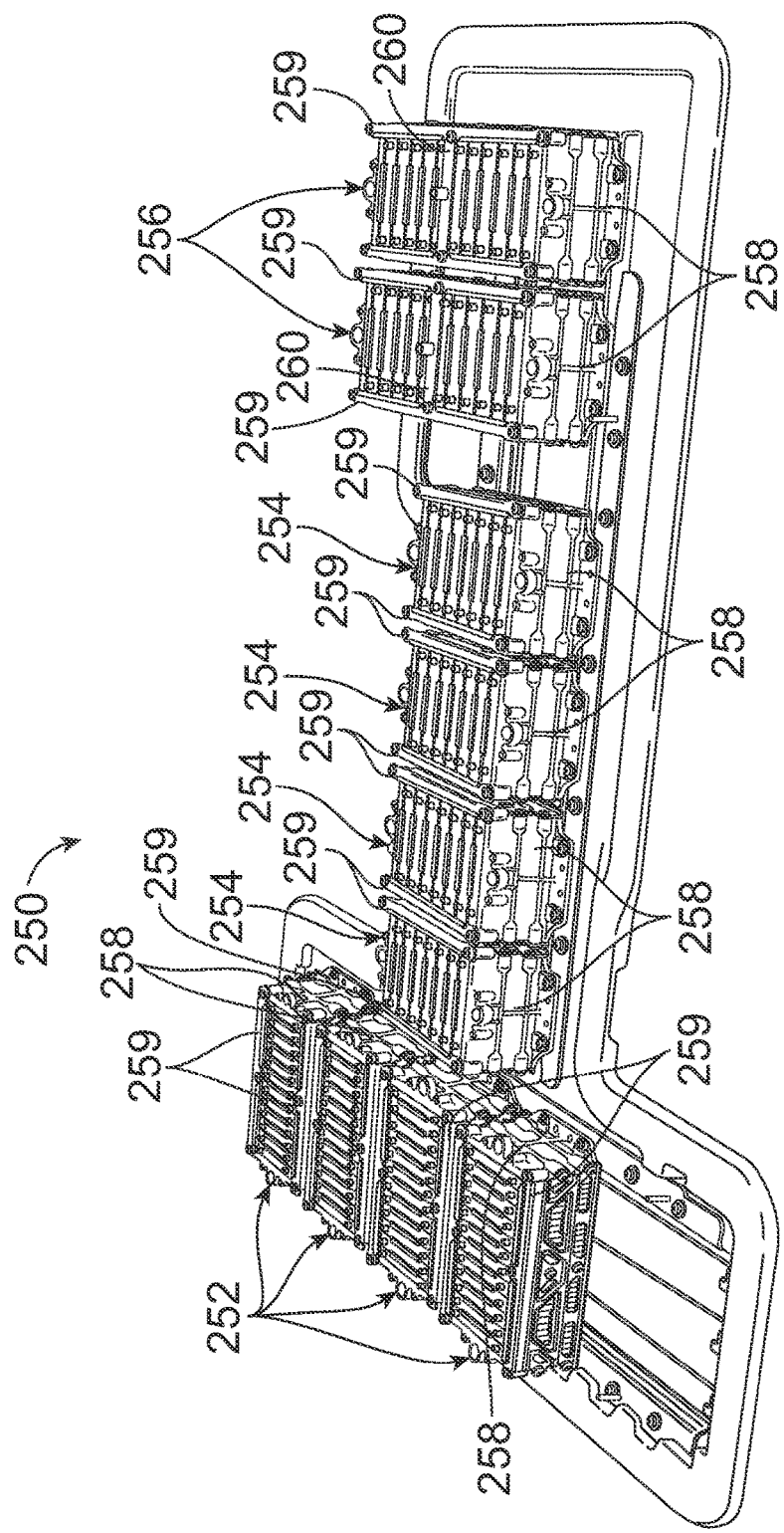
FIG. 12 is a perspective view of a portion of another traction battery assembly including multiple battery assemblies having exo-support structures and battery cell arrays.

While FIG. 9 shows one example of the battery cell 146, the exo-support structure 142 may also be used for other types of battery cells having different performance requirements and dimensional characteristics. For example, with PHEVs and BEVs, the desired geometry and package space provided for the respective battery cell array may dictate having multiple configurations of battery cells within multiple battery cell arrays. In these examples, the battery cells may be fourteen PHEV battery cells in the battery cell array. For FHEVs, the battery cells may be thirty FHEV battery cells in the battery cell array. It may also be beneficial to have different types of battery cell arrays within a vehicle. For example, FIG. 12 shows a portion of a traction battery assembly including a group of battery assemblies 250 having four battery cell arrays 252, four battery cell arrays 254, and two battery cell arrays 256. As shown, the end plates 258 and side plates 259 of each of the exo-support structures retaining the respective battery cell arrays may be modified to accommodate the particular battery cell array. The battery cell arrays 252 and 254 may not need additional structural support so a midplate is not included. However, the battery cell arrays 256 are slightly longer than the battery cell arrays 252 and 254 and as such, may include midplates 260.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   an array of battery cells each having a first minor upper face, a second minor lower face, and a pair of major side faces extending therebetween;
   spacers disposed between the battery cells and including a lower ridge extending along a central portion of the spacer to contact adjacent battery cells between the second minor lower face and one of the pair of the major side faces and further including a lower edge extending along portions of the spacer on either side of the central portion without contacting a supporting thermal plate, wherein the second minor lower face is substantially flush with the thermal plate disposed therebelow;
   a midplate centrally located within the array defining a width greater than a spacer width; and
   a pair of end plates and a pair of side plates arranged to form a four-sided enclosure around the faces to compress the cells without mechanical attachment or covering the second minor faces,
   wherein each of the side plates further includes a lower horizontal edge, an upper horizontal edge, and at least one diagonal reinforcement rib having an end adjacent the midplate at the lower horizontal edge or the upper horizontal edge and adjacent a portion of the side plate secured thereto.

2. The assembly of claim 1, wherein the end plates and side plates each have a pair of vertical edge portions and are mechanically fastened to one another at respective vertical edge portions by mechanical fasteners.

3. The assembly of claim 2, wherein the each of the side plates defines a plane and at least one of the mechanical fasteners is oriented substantially perpendicular with the plane.

4. The assembly of claim 1, wherein the midplate is mechanically fastened to the side plates and arranged with the end plates and side plates to receive a bending moment force generated by the side plates.

5. The assembly of claim 1, wherein each of the spacers includes a tab extending from an upper portion of the spacer configured to locate and mate with a busbar module extending between the end faces of the array.

6. The assembly of claim 1, wherein each of the end plates defines a vertically oriented lift aperture at an upper portion of the end plates configured to be gripped by an installation tool.

7. A traction battery assembly comprising:
   an array of battery cells each having opposing side faces and a bottom face for contacting a thermal plate;
   spacers disposed between the side faces each defining a lower ridge extending a partial central length for cell contact between respective side and bottom faces and defining a lower edge extending on both sides of the lower ridge without contacting the plate; and
   a midplate centrally located within the array.

8. The assembly of claim 7 further comprising a four-sided support structure, wherein the bottom faces of the battery cells define a footprint, wherein the four-sided support structure is located outside the footprint and includes opposing end plates and side plates configured to compress and retain the cells therebetween without being mechanically fastened thereto, and wherein the side plates include an upper portion covering and extending along a portion of an upper face of each battery cell such that the upper portion and thermal plate generate vertical forces against the upper face and bottom face, respectively.

9. The assembly of claim 8, wherein the end plates and side plates each define attachment apertures oriented substantially parallel with a length of the cells at four corners of the structure outside the footprint and configured to receive fasteners to mechanically attach the plates to one another.

10. The assembly of claim 8, wherein the end plates and side plates each define attachment apertures oriented substantially parallel with a height of the cells at four corners of the structure outside the footprint and configured to receive fasteners to mechanically attach the plates to one another.

11. The assembly of claim 8, wherein the side plates at least partially contact respective opposing side faces of outer battery cells of the array.

12. The assembly of claim 8 wherein the midplate is attached to a substantially central portion of either side plate and configured to deflect compressional forces applied to the array.

13. The assembly of claim 12, wherein the side plates each define at least one diagonal reinforcement rib extending from a lower horizontal edge of the side plates to a location on the upper portion of the side plates which is substantially equidistant from the end plate and midplate.

* * * * *